(12) United States Patent
Blair et al.

(10) Patent No.: US 6,611,631 B1
(45) Date of Patent: Aug. 26, 2003

(54) DATA MANAGEMENT FOR ROTATED SAMPLED IMAGES

(75) Inventors: Stuart R. Blair, San Francisco, CA (US); Lars U. Borg, Saratoga, CA (US); Matthew J. Foley, Santa Clara, CA (US); John D. Morris, Walnut Creek, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/260,986

(22) Filed: Mar. 1, 1999

(51) Int. Cl.$^7$ .................................................. G06K 9/32
(52) U.S. Cl. ...................... 382/296; 382/305
(58) Field of Search ................. 345/648, 418, 345/421, 422, 536, 538, 649, 560; 348/580, 583; 358/1.1, 1.4, 1.6; 382/277, 297, 296, 289, 290, 295, 305; 347/12; 707/530, 500, 517

(56) References Cited

U.S. PATENT DOCUMENTS

| | | | |
|---|---|---|---|
| 4,271,476 A | | 6/1981 | Lotspiech .................... 382/235 |
| 4,627,097 A | * | 12/1986 | Finlay et al. ................ 382/297 |
| 4,850,028 A | * | 7/1989 | Kawamura et al. .......... 382/296 |
| 5,012,434 A | | 4/1991 | Zietlow et al. ............. 358/1.18 |
| 5,412,768 A | * | 5/1995 | Ozaki .......................... 345/585 |
| 5,670,981 A | * | 9/1997 | Jensen ......................... 345/603 |
| 5,751,865 A | | 5/1998 | Micco et al. ................ 382/296 |

FOREIGN PATENT DOCUMENTS

| | | |
|---|---|---|
| EP | 0 235 456 A2 | 9/1987 |
| EP | 0 685 960 A2 | 12/1995 |
| EP | 0 772 156 A2 | 5/1997 |

OTHER PUBLICATIONS

Foley et al., "Computer Graphics Principles and Practice", Sec. Edition, Addison–Wesley Publishing Co., pp. 828–835, 1990.

Moebes, W., et al., "Dimensionally Stable Laminates of Copper with Resin–Impregnated Paper for Circuit Boards," abstract bulletin of the institute of paper chemistry, the institute of paper chemistry–library, Appleton, U.S., vol. 59, No. 1, p. 141, Jul. 1, 1988.

Foley et al., "Computer Graphics Principles and Practice", Sec. Edition, Addison–Wesley Publishing Co., pp. 828–835, 1990.

* cited by examiner

*Primary Examiner*—Bhavesh Mehta
*Assistant Examiner*—Kanji Patel
(74) *Attorney, Agent, or Firm*—Fish & Richardson P.C.

(57) ABSTRACT

Methods and apparatus for managing a source image that is output in a rotated or skewed orientation to a raster buffer. The source image includes a plurality of source samples arranged in source rows having a source direction. The raster buffer is oriented in a destination space and receives the rotated or skewed image as a series of samples in rows defined by a destination direction. The raster buffer provides rows of samples to a rendering device for rendering scan lines for output on a raster device. The method includes determining an angle between the source direction and the destination direction and adjusting the organization of the source samples to align source samples in scan rows where each scan line can be rendered from the raster buffer using at most a predetermined small number of scan rows.

64 Claims, 13 Drawing Sheets

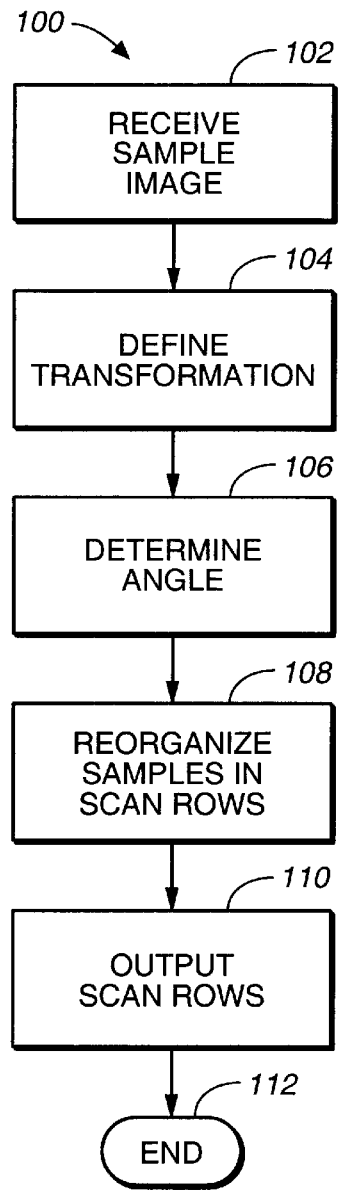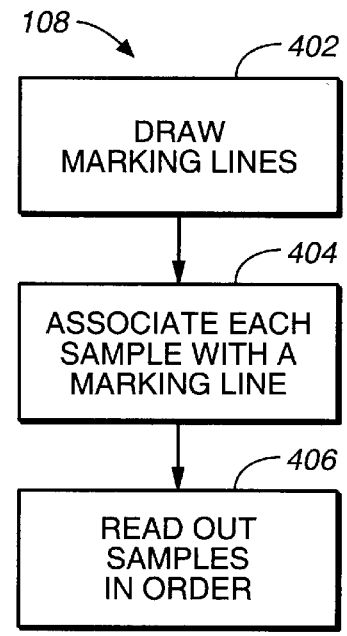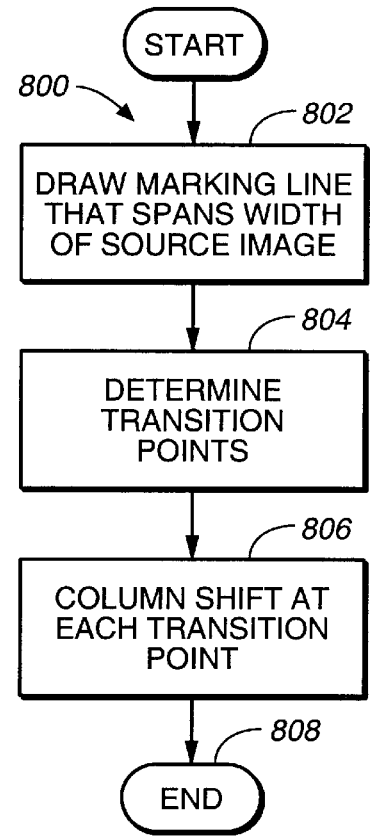

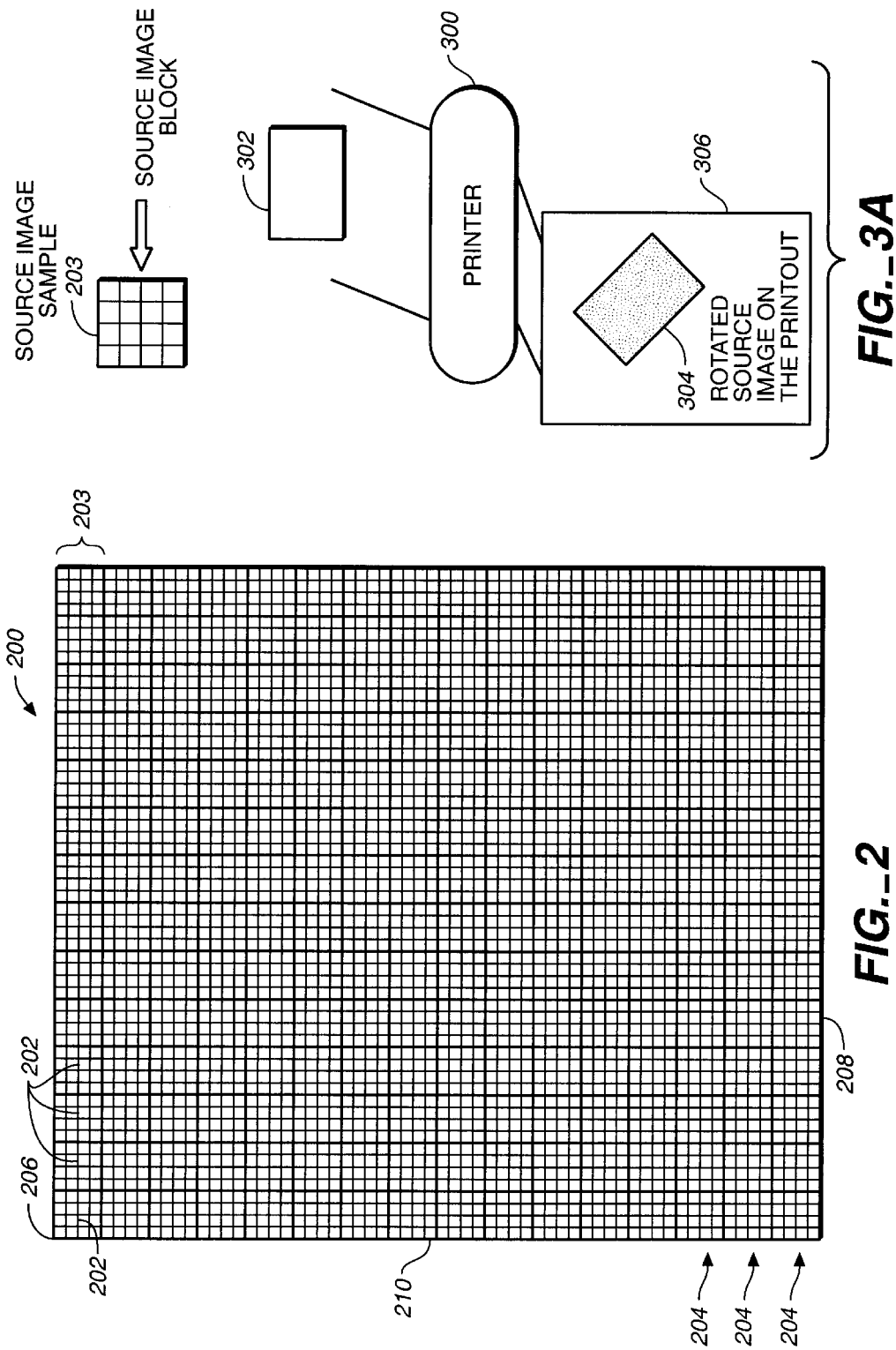

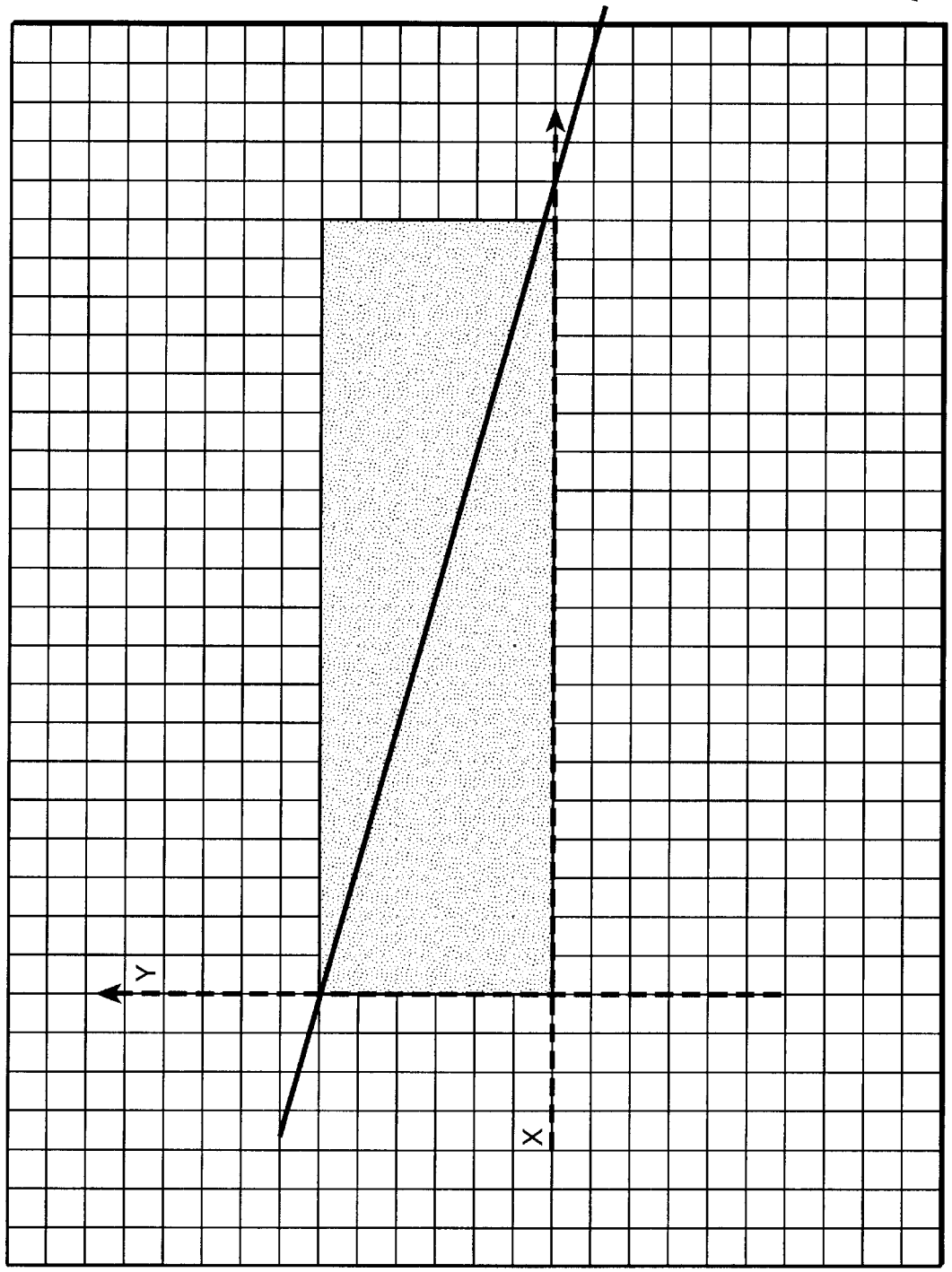
FIG._3B

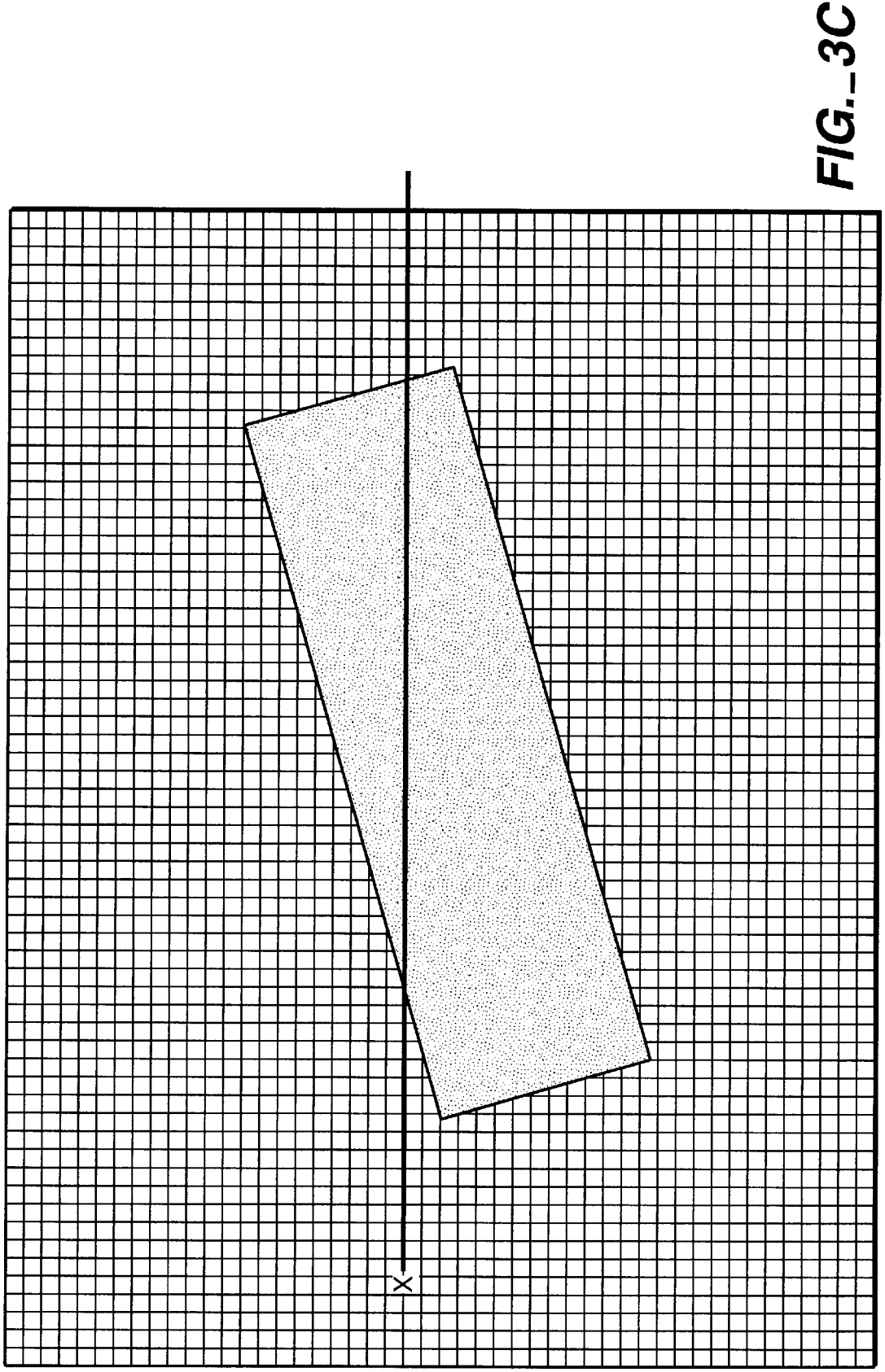
FIG._3C

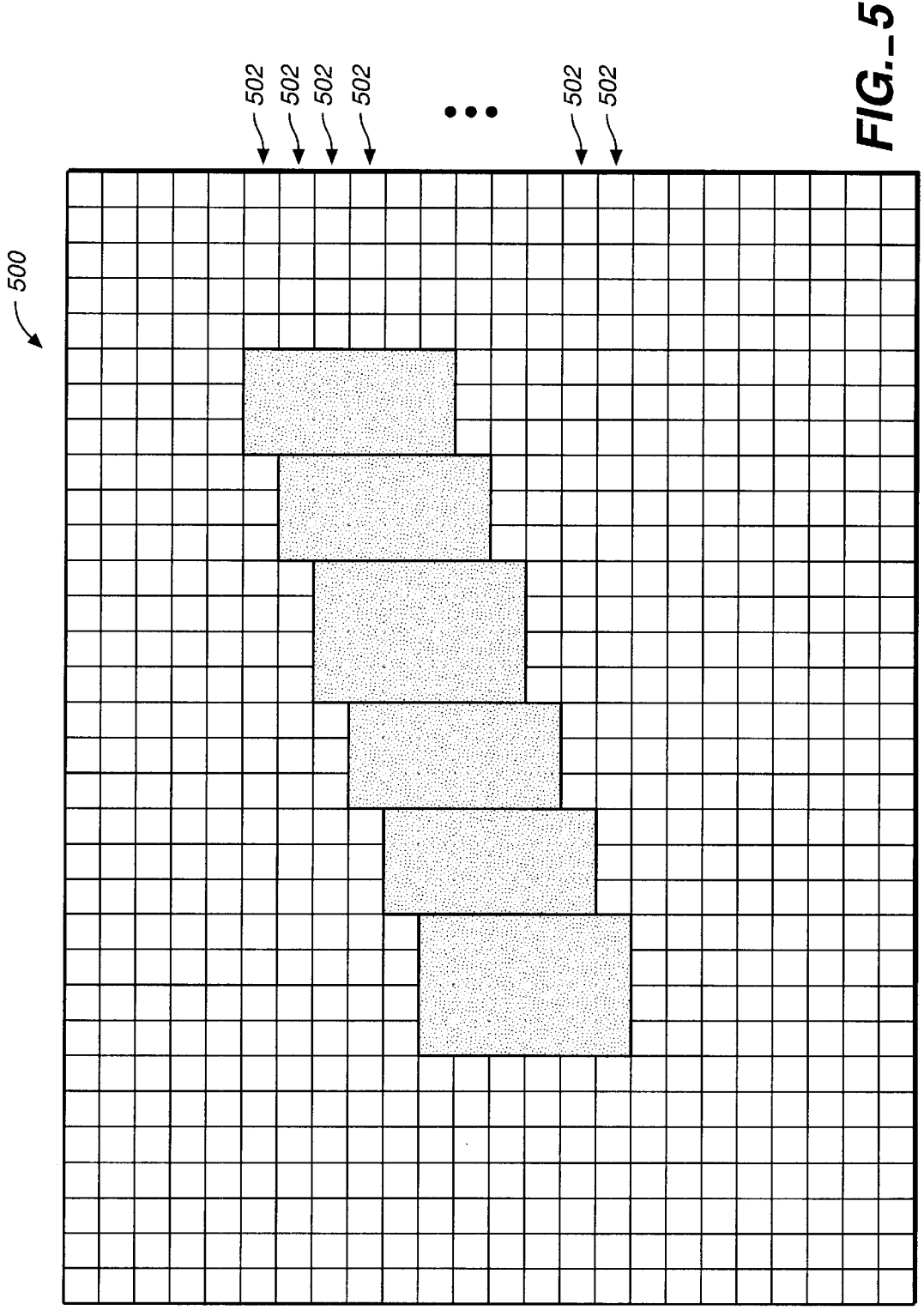
FIG._5

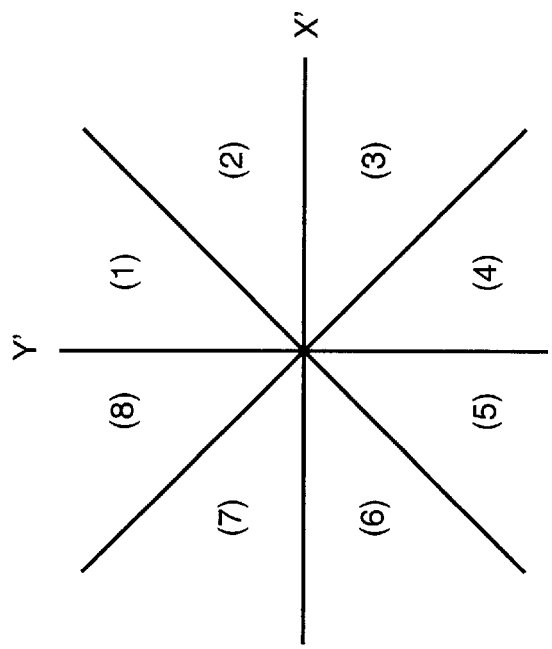
FIG._6B
EXCHANGING THE X AND Y AXES IS EQUIVALENT TO "FLIPPING" THE COORDINATE SYSTEM ALONG THE 45-DEGREE LINE BETWEEN THE AXES. THE FORMER Y AXIS HAS BECOME THE X' AXIS, THE FORMER X AXIS HAS BECOME THE Y' AXIS, AND THE NEW POSITIONS OF THE FORMER OCTANTS (RELATIVE TO DIAGRAM 6A) IS SHOWN BY THE NUMBERS IN PARENTHESES.
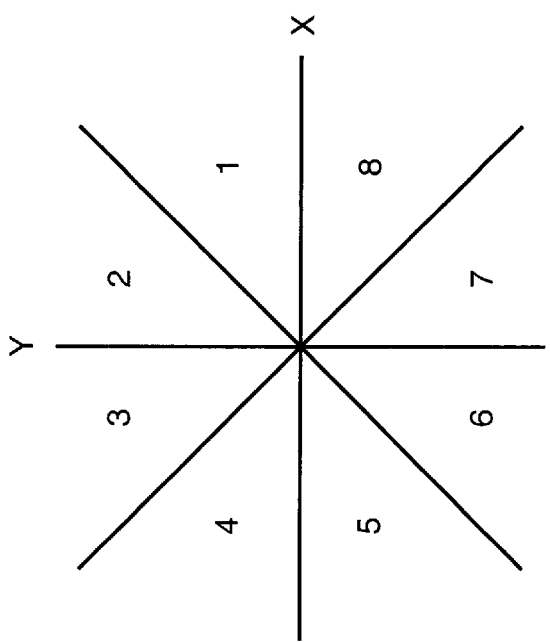
FIG._6A
OCTANTS ARE NUMBERED 1-8.

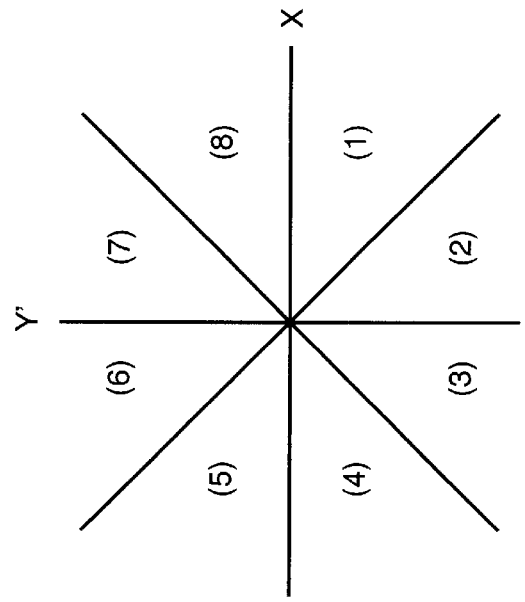

REVERSING THE Y AXIS IS EQUIVALENT TO "FLIPPING" THE COORDINATE SYSTEM ALONG THE X AXIS. THE FORMER Y AXIS HAS BECOME THE Y' AXIS, AND THE NEW POSITIONS OF THE FORMER OCTANTS (RELATIVE TO DIAGRAM 6A) IS SHOWN BY THE NUMBERS IN PARENTHESES.

*FIG._6D*

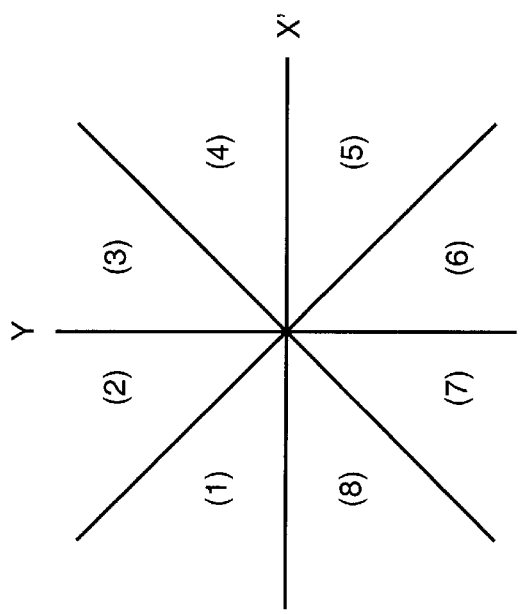

REVERSING THE X AXIS IS EQUIVALENT TO "FLIPPING" THE COORDINATE SYSTEM ALONG THE Y AXIS. THE FORMER X AXIS HAS BECOME THE X' AXIS, AND THE NEW POSITIONS OF THE FORMER OCTANTS (RELATIVE TO DIAGRAM 6A) IS SHOWN BY THE NUMBERS IN PARENTHESES.

*FIG._6C*

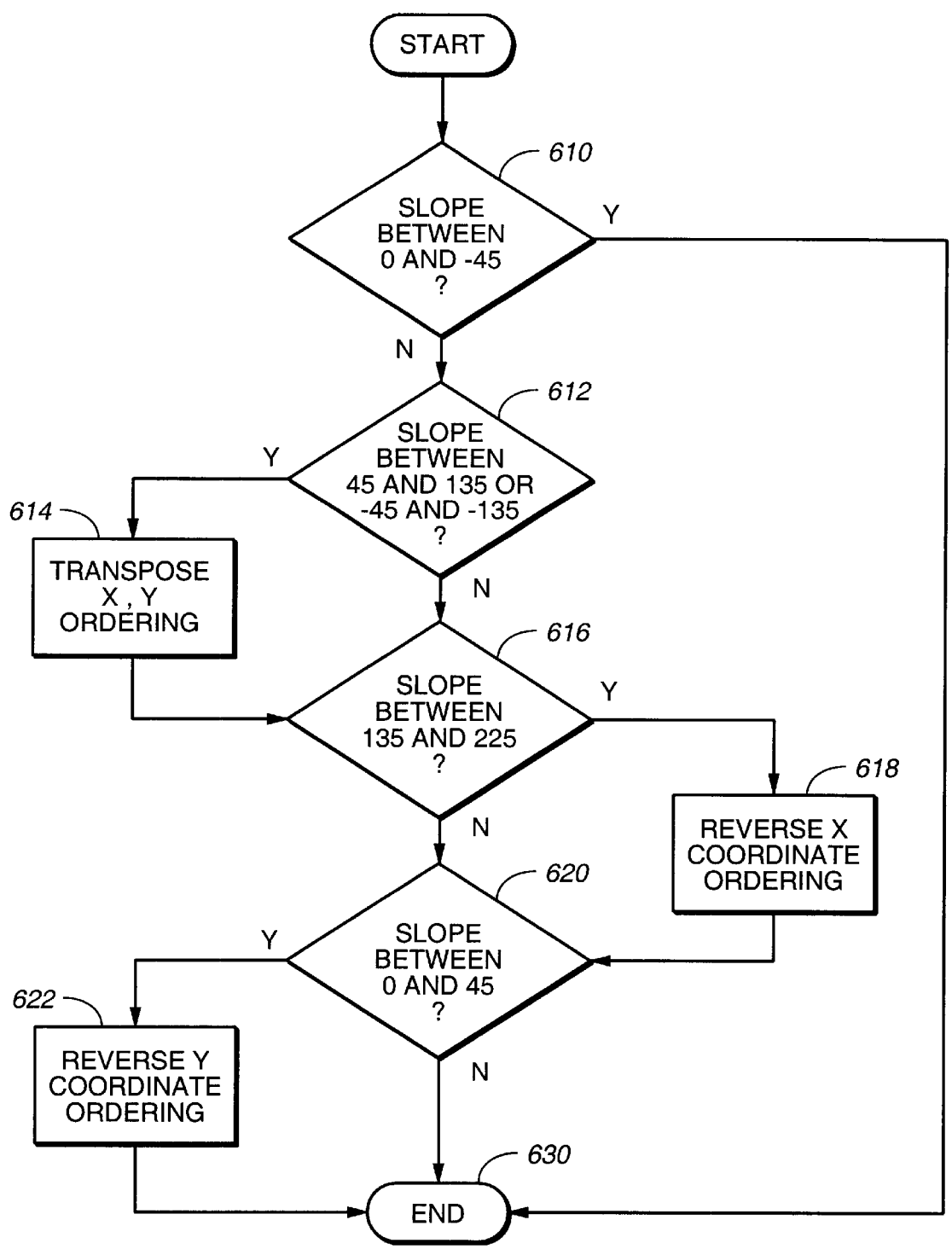
FIG._6E

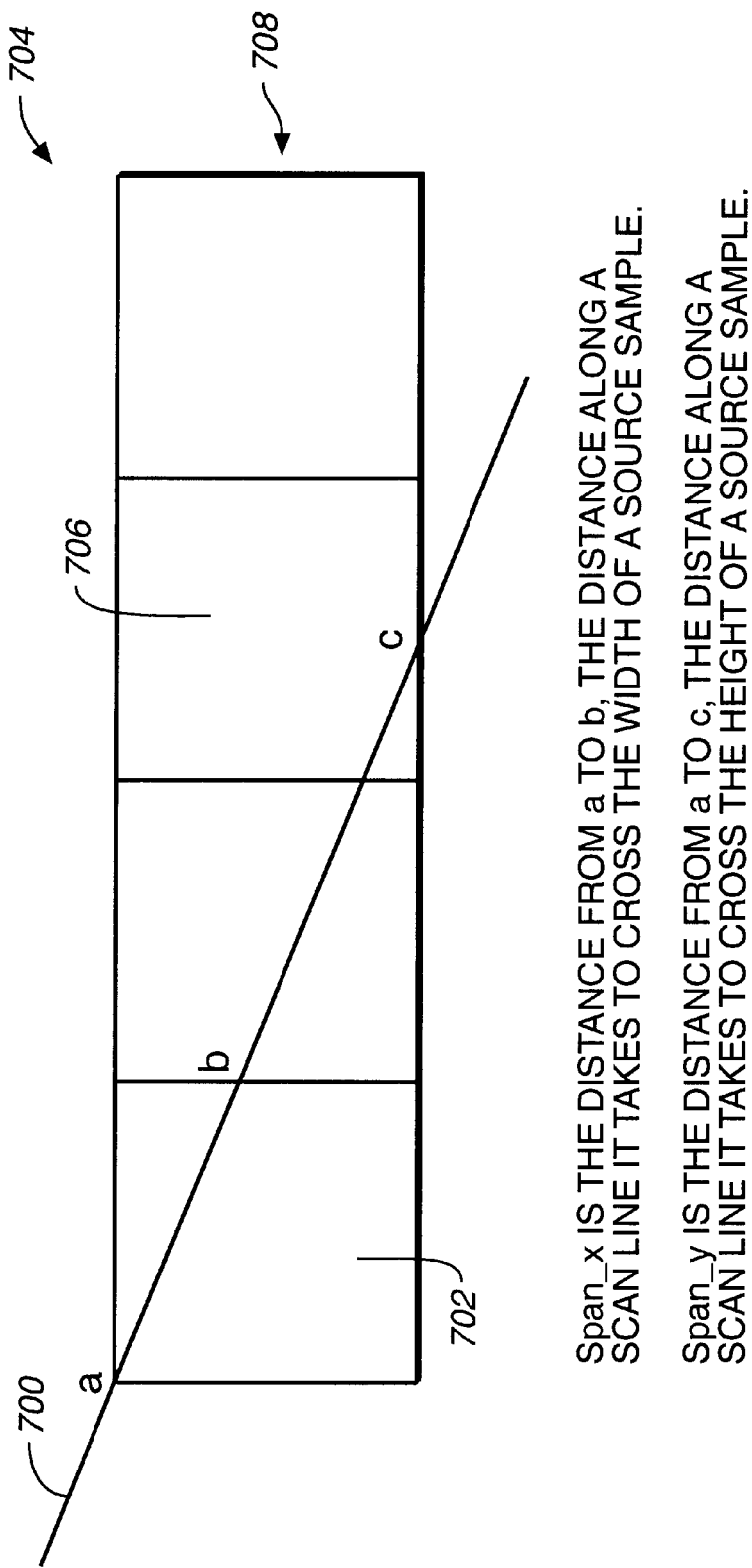
FIG._7
Span_x IS THE DISTANCE FROM a TO b, THE DISTANCE ALONG A SCAN LINE IT TAKES TO CROSS THE WIDTH OF A SOURCE SAMPLE.
Span_y IS THE DISTANCE FROM a TO c, THE DISTANCE ALONG A SCAN LINE IT TAKES TO CROSS THE HEIGHT OF A SOURCE SAMPLE.

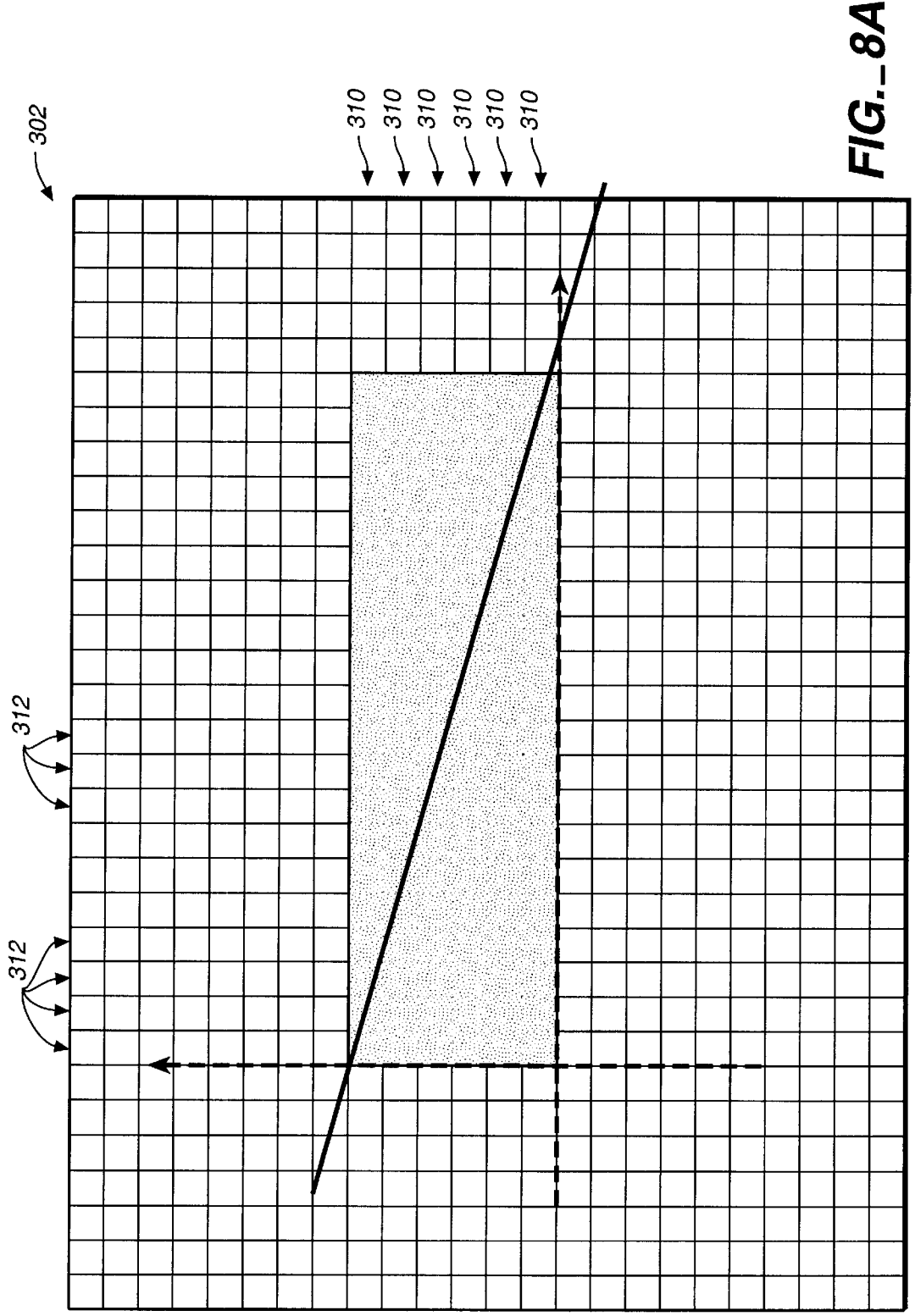
FIG._8A

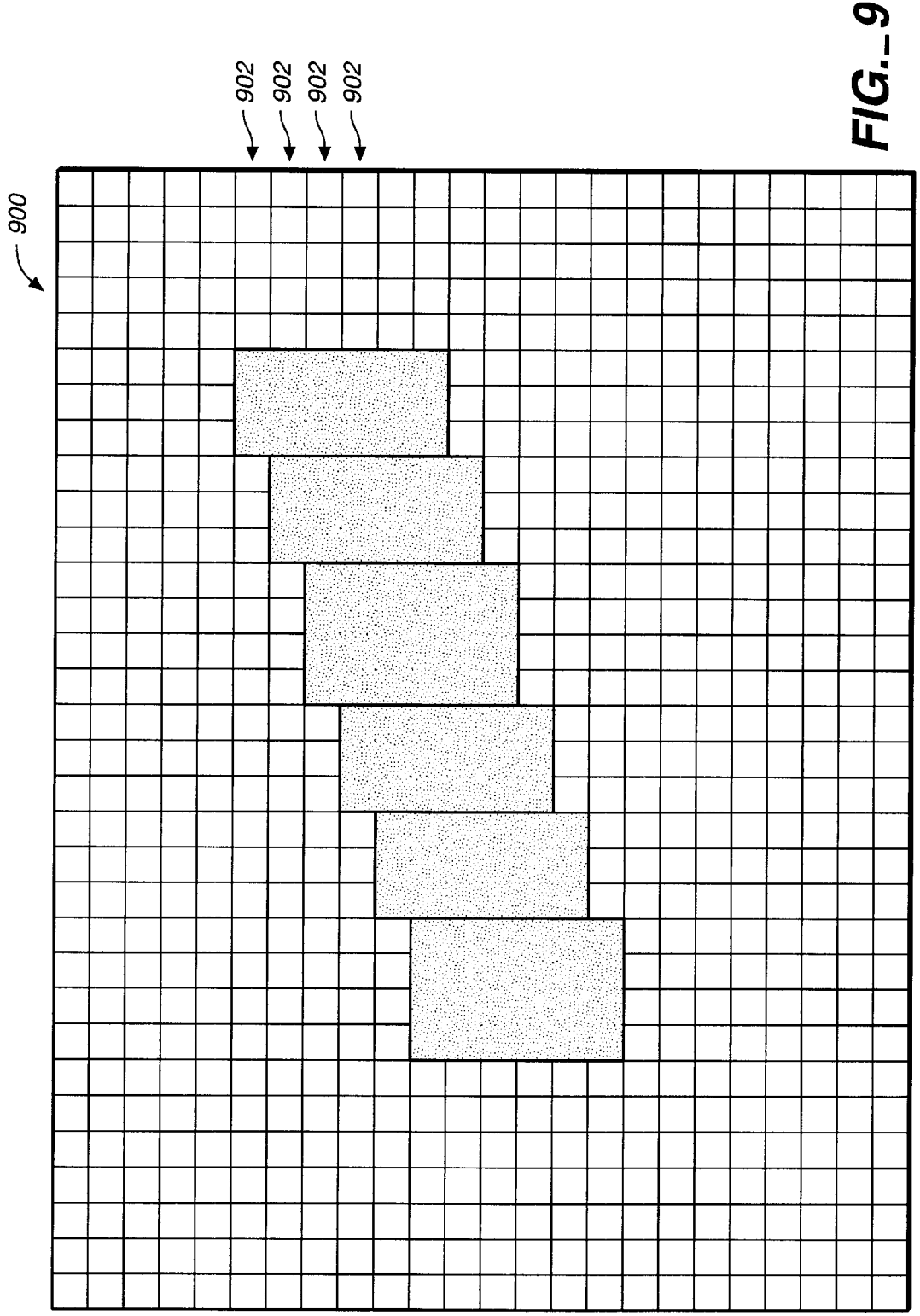
FIG._9

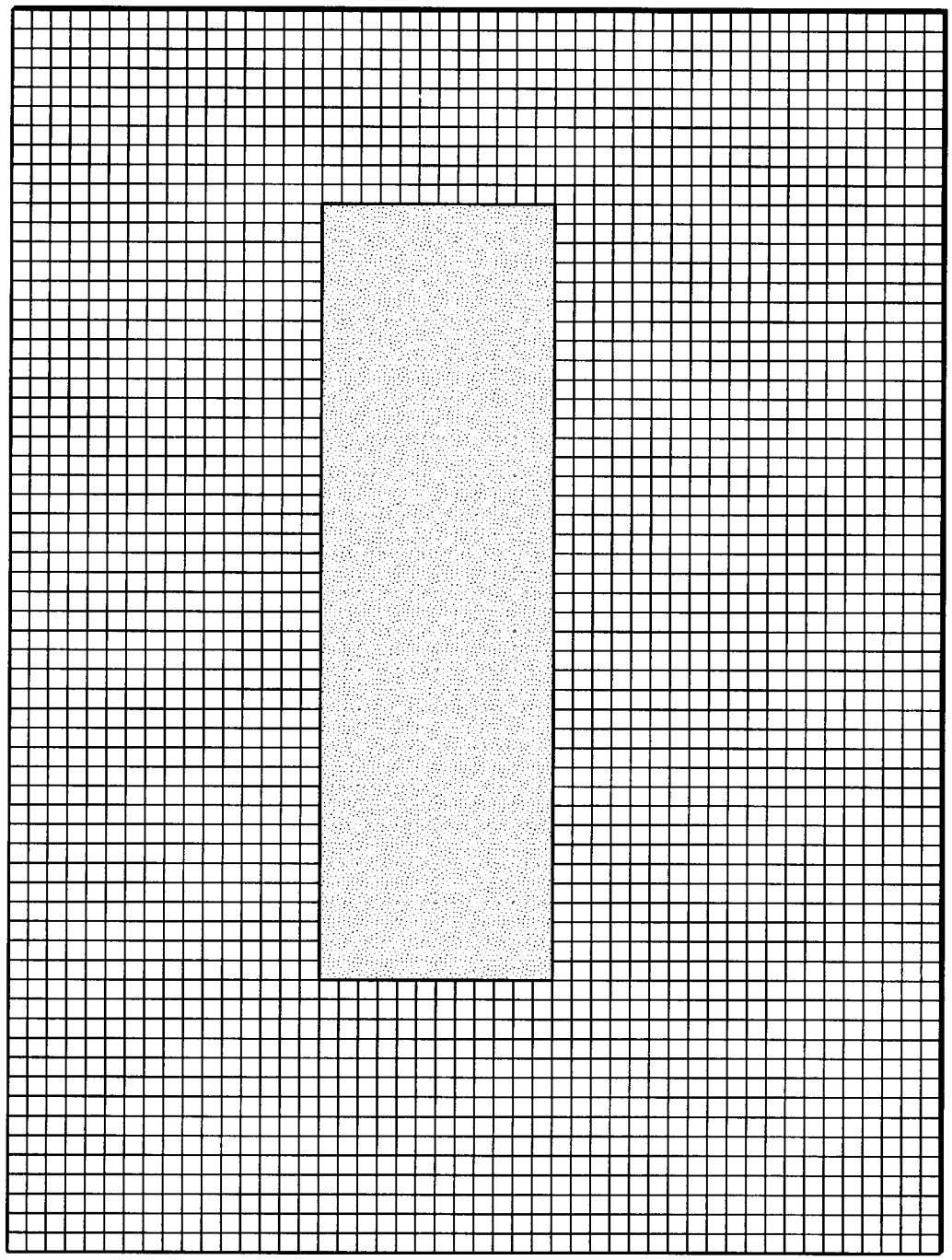
FIG._10A

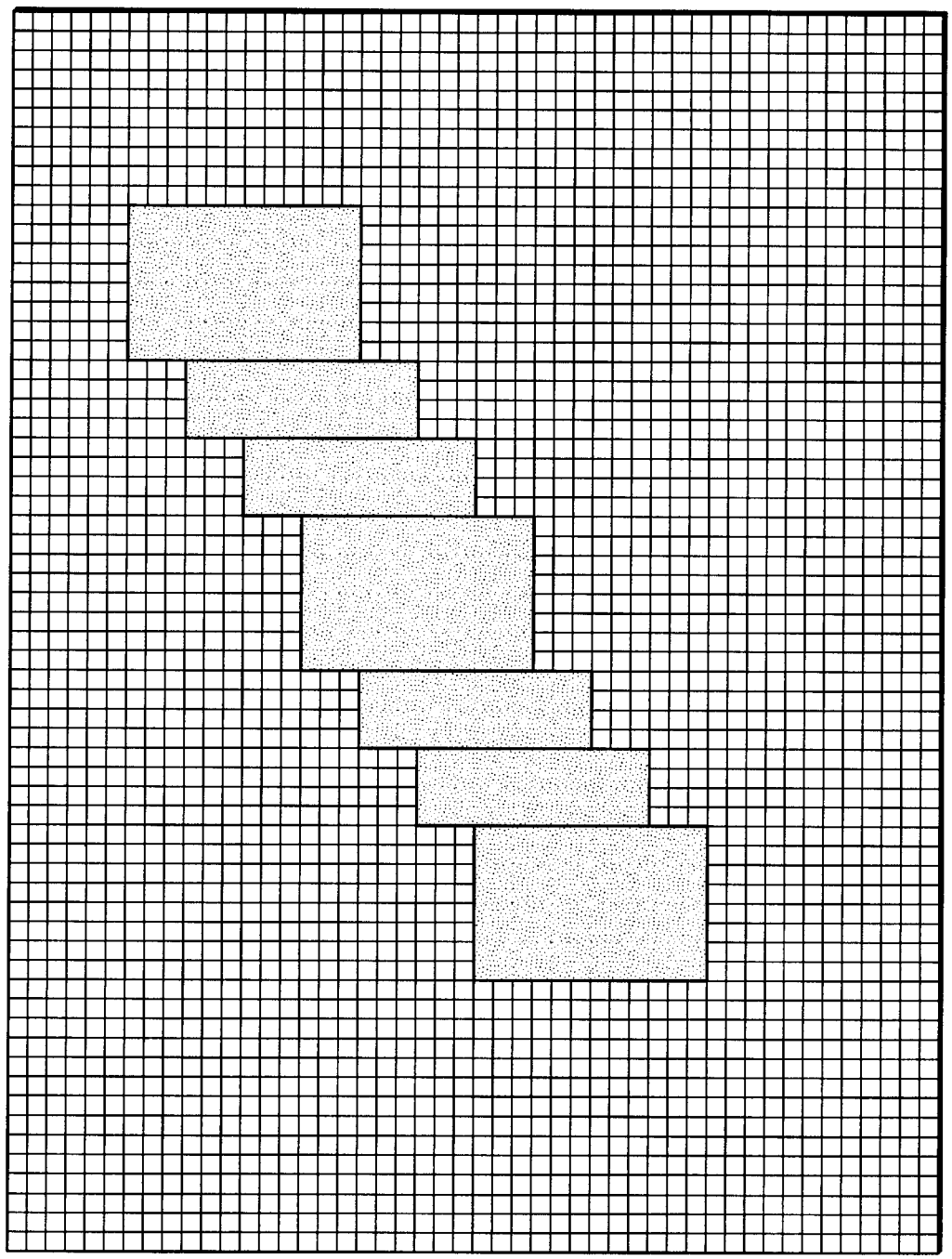

DATA MANAGEMENT FOR ROTATED SAMPLED IMAGES

The present invention relates generally to data management and more particularly to methods and apparatus for managing data for rotated or skewed images.

BACKGROUND OF THE INVENTION

The present invention is directed to applications having graphical objects that are sampled images, or slices of sampled images. A sampled image (or image) can be defined in a source space that includes sequentially ordered source samples arranged in source rows. Data management of the image may be complicated by the application of one or more transformations for transforming the source image into a different device space. For example, in a printer or other display device, it is often required to receive a sampled image from some source, store it in an intermediate data store (e.g., a computer's random access memory or a file on a computer's file system), and then render it using a transformation matrix into the device space of a raster device.

The sampled image can be defined in a source space which comprises a two-dimensional orthonormal coordinate system in which the samples of the sampled image form a square lattice. The x-axis in source space is oriented along the fast scan direction of the sampled image, that is, the direction of the typical linear ordering of sequential samples into rows. The y-axis in source space is oriented along the slow scan direction of the sampled image, that is, the direction of the typical linear ordering of sequential rows. In the printer example described above, the image data is often very large, and usually received by the data store in sequential source rows, which may be grouped into slices. A source row is a sequential row of samples in a sampled image, spanning the entire width of the sampled image. A slice is a group of sequential source rows.

The raster device can be defined in a device space which comprises a two-dimensional orthogonal coordinate system in which the raster elements of the raster device form a rectangular lattice. The x-axis in device space is oriented along the fast scan direction of the raster device, that is, the direction of the typical linear ordering of sequential raster elements into rasters (scan lines). The y-axis in device space is oriented along the slow scan direction of the raster device, that is, the direction of the typical linear ordering of sequential rows (scan lines) of rasters.

Rendering is a process for visually displaying a sampled image by converting it into raster elements on a raster device.

The conversion includes an affine coordinate transformation from source space into device space. The transformation may include many forms of "rotation" including translation, scaling, shearing, as well as a conventional rotation, and combinations of these. An affine coordinate transformation is a geometric transformation of a coordinate system (as a translation, rotation, or a uniform stretching) that carries straight lines into straight lines and parallel lines into parallel lines, but may alter distances between points and angles between lines.

When source space and device space are not aligned, then the rendering of a sampled image from the source to the raster device results in a rotated image. A rotated image includes an affine coordinate transformation from source space into device space, such that the x-axis in source space is carried into device space with an orientation not parallel or aligned with the x-axis in device space. The transformation of the source image to device space may result in numerous data management issues.

Many raster devices are managed in bands. The data store required to support the raster elements of a typical four-color halftoned bi-level raster device at 1440 dpi resolution is almost a megabyte per square inch. Thus, to manage an entire A4-size page of raster data for such a device might require approximately a 90 MB data store, which is a prohibitive amount in many applications. However, to manage only a band at a time of raster data takes a much smaller data store; for example a band 512 scan lines high and the width of an A4 page, on the same device, would require approximately only a 3 MB data store.

Banded raster devices are implemented with a variety of techniques, which are fairly well known in the printer industry. Generally speaking during the render process, bands are rendered sequentially, then delivered to the raster device in order. But the graphical objects to be rendered onto the page are not necessarily received by the render engine in the same order as required for sequential band rendering. A display list can be used to store all graphical objects to be rendered onto the page, until it is certain that all objects to be rendered onto a specified band are stored. Then that band may be rendered. In this case, the data store (or image store) may be considered logically part of the display list, although it may be physically part of or separate from the data store used for the display list.

If a sampled image is rendered without rotation, that is with source rows parallel to raster device scan lines, then it is relatively easy to manage the image store incrementally. As each band is rendered, the source slices intersecting that band and not intersecting any other un-rendered bands may be discarded, freeing up a portion of the data store to receive new data.

When the sampled image is rotated, data management of the image data becomes much more difficult. For example, in the nominal worst case the image may be designated to be rotated ninety degrees, so that the source rows are rendered perpendicular to raster device scan lines. In this case, each slice of the source unrotated image intersects potentially many or all bands, and each affected band intersects all slices. There is no opportunity for incremental management of the data store, since as long as any of the image data must be stored, it all must be stored.

Another data management problem may arise when transporting image data from one data store to another. For example, in a distributed system, a process receiving a sampled image may be physically or logically separated from the rendering process. In this case, the image data must be transported from one process to the other, by sending the data over a communication channel, or by exchanging data pointers via a computer technique called inter-process communication (IPC). Regardless of the means of transport, it is often desirable to transport the image data incrementally, where the preferred increment is a band. Where, the image data associated with an output band spans a large number of the source rows associated with the sampled image, the incremental transport requires the maintenance of all of the data in the data store throughout the transport.

Data management can also affect the efficiency of a rendering process. On banded raster devices, image data is typically rendered a scan line at a time. The rendering operation requires sequentially accessing all the image samples intersected by the scan line. When the sampled image is not rotated, the sequential access generally approximates an access to a single source row, and has a high degree of locality of access. In an operation accessing multiple elements of data from a data store, the operation is said to have "locality of access" if each element sequentially accessed is close to (or "local to") the previously accessed element. The definition of "close to" depends on the physical characteristics of the data store, but generally operations with high degree of locality of access can occur more efficiently and more quickly than operations with a low degree of locality of access. This efficiency results from two common techniques for sequential data access, caching and burst (for computer memory) or buffered (for a file system) accesses. When the image is to be rotated in the rendering process, the "access" spans many (or all) of the source rows resulting in a poor locality of access factor, which may impair the efficiency of the rendering operation.

In summary, sampled image data is typically ordered in sequences of source rows as described above. The ordering of data (defined in a source space), when the image is to be rotated (into a device space), is not conducive to (a) cutting the image into bands, (b) managing the image data in a band-oriented way, for incremental management of an image store or for incremental transport of image data, or (c) efficient sequential access, with a high degree of locality of access, by a rendering process. Thus, management and rendering of image data for rotated images may require a much larger data store, and be much less efficient, than for non-rotated images.

SUMMARY OF THE INVENTION

In one aspect, the invention provides a method of managing a source image that is output in a rotated or skewed orientation to a raster buffer. The source image includes a plurality of source samples arranged in source rows having a source direction. The raster buffer is oriented in a destination space and receives the rotated or skewed image as a series of samples in rows defined by a destination direction. The raster buffer provides rows of samples to a rendering device for rendering scan lines for output on a raster device. The method includes determining an angle between the source direction and the destination direction and adjusting the organization of the source samples to align source samples in scan rows where each scan line can be rendered from the raster buffer using at most a predetermined small number of scan rows.

Aspects of the invention can include one or more of the following features. The step of determining the angle includes determining if the angle measured in source space is between 0 and −45 degrees, and if not initially adjusting the organization of the samples so that the angle is between 0 and −45 degrees.

The step of initially adjusting includes determining if the angle or an effective new angle is between 45 and 135 degrees or −135 and −45 degrees, and, if so, revising the ordering of samples by transposing the samples relative to a line at 45 degrees passing through an origin of the source image resulting in an effective new angle falling between −45 and 45 degrees or 135 and 225 degrees.

The step of initially adjusting includes determining if the angle or an effective new angle is between 90 and 270 degrees, and, if so, reversing the x coordinate ordering of the samples resulting in an effective new angle falling between 90 and −90 degrees.

The step of initially adjusting includes determining if the angle or an effective new angle is between 0 and 180 degrees, and, if so, reversing the y coordinate ordering of the samples resulting in an effective new angle falling between 0 and −180 degrees.

The step of initially adjusting includes processes selected from the group of transposing in both axes, reversing the ordering in the x-axis and reversing the ordering in the y-axis for samples depending on the slope.

The method can include locating one or more marking lines that span a width of the source image. The marking lines are parallel to the rows in the raster buffer and have a slope defined by the angle. Transition points along the length of a marking line are identified. Each transition point defines a last source sample in a current source row that the marking line passes through prior to transitioning to a next source row of source samples. The step of adjusting includes shifting columns of source samples enclosed between transition points to align the source samples in scan rows.

The marking line is a idealized scan line. Only one marking line is located spanning the width of the source image and enclosed within the boundaries of the source image. Only one marking line is located that extends beyond the boundaries of the source image and spans the entire width of the source image.

The step of adjusting the organization of the source samples is combined with other image processing steps selected from the group of compression, decompression, resampling and color correction to achieve computational efficiency compared to doing such steps in a sequence.

The method includes locating one or more marking lines spanning a width of the source image, identifying transition points along a width of the source image where the transition points define a point where adjacent source samples in a source row map to different marking lines and wherein the step of adjusting includes shifting columns of source samples enclosed between transition points to align the source samples in scan rows.

Each sample is mapped to exactly one marking line. The columns are incrementally shifted one unit at each transition point. The incremental shifts are accumulated across a width of the sampled image.

One unit is equal to one row or one block. A block is sized to achieve byte alignment when adjusting samples. The predetermined small number of scan rows is three.

The method includes locating a plurality of marking lines spanning a width of the source image and the step of adjusting includes associating each source sample with a single marking line and adjusting the order of the samples including assigning all source samples associated with each marking line to a unique scan row. A source sample is associated with a marking line that intersects the source sample. The step of associating includes determining if a source sample is intersected by two or more marking lines associated with two or more scan rows and if so, assigning the source sample to a first scan row that is to be rendered of the two or more scan rows.

All source rows of the source image are available for processing and the step of adjusting outputs data to the rendering device a scan row at a time. The step of adjusting identifies all source samples associated with a scan row and outputs all those source samples in order as a scan row to the rendering device. The scan rows are stored in a memory device and the source rows are received and processed a slice at a time. A slice includes a set of source rows. Each source row is processed including determining which scan row to assign each source sample and storing the source sample in the assigned scan row in the memory device.

The source samples are not byte aligned. The method further includes grouping source samples in blocks that are aligned with a byte boundary and the step of adjusting the ordering of samples adjusts groups of samples on block boundaries. The step of adjusting includes determining a horizontal block width defining a number of consecutive samples grouped together in a block of samples to achieve byte boundary alignment, and determining a vertical block height defining a number of consecutive horizontal samples in consecutive rows to be grouped together in each block of samples. The vertical block height is determined using the angle and the horizontal block width.

In another aspect the invention provides a method of managing data for a source image to be printed in a rotated or skewed orientation on an printing device. The source image includes a plurality of source samples arranged in source rows having a source direction. The printing device prints a rotated source image in a series of scan lines defined by a scan direction. The method includes determining an angle between the source direction and the scan direction and locating an idealized scan line that spans a width of the source image. The idealized scan line is parallel to the scan lines of the printing device and has a slope defined by the angle. The method includes identifying transition points along the length of the idealized scan line where each transition point defines a last sample in a source row touched by the idealized scan line. The organization of the source samples is adjusted including shifting columns of source samples enclosed between transition points to align the source samples in scan rows. Consecutive scan rows are outputted incrementally to the printing device to support rendering of source samples for each scan line.

In another aspect the invention provides a method of managing a source image that is transferred in a rotated or skewed orientation to an output buffer. The source image includes a plurality of source samples arranged in source rows having a source direction. The output buffer is oriented in a destination space and receives the rotated or skewed image as a series of samples in destination rows defined by a destination direction. The output buffer outputs the rotated or skewed image in an output order to another device. The method includes determining an angle between the source direction and the destination direction and adjusting the organization of the source samples to align source samples in scan rows to reflect the output ordering of the output buffer.

In another aspect, the invention provides a method of incrementally managing image data that is output in a rotated or skewed orientation to a raster buffer. The image data includes a plurality of source samples arranged in source rows having a source direction. The raster buffer is oriented in a destination space and receives the rotated or skewed image data as a series of samples in destination rows defined by a destination direction. The method includes determining an angle between the source direction and the destination direction, adjusting the organization of the source samples to align source samples in scan rows to reflect a render ordering of destination rows of the raster buffer, storing the reorganized samples in a intermediary data store and incrementally transferring a set of scan rows at a time to a rendering device for rendering and deleting a transferred set from the intermediary data store.

In another aspect the invention provides a method for minimizing the number of samples provided to a rendering engine in order to render a rotated or skewed image and includes receiving a sampled image defined in a source space. The sampled image includes a plurality of source samples arranged in source rows having a source direction. A destination region intersecting a portion of the sampled image is identified. The destination region is oriented in a destination space reflecting a render ordering of a rotated or skewed transformation of the sampled image to the destination space. A subset of the samples of the sampled image are selected that are enclosed by the destination region, the selected subset of samples are arranged into scan rows and the rows of samples associated with the destination region are provided to the render engine in scan row order.

In another aspect the invention provides a method of managing data for a source image to be printed in a rotated or skewed orientation on an printing device. The source image includes a plurality of source samples arranged in source rows having a source direction. The printing device prints a rotated source image in a series of scan lines defined by a scan direction. The method includes adjusting the organization of the source samples including shifting columns of source samples align the source samples in scan rows that and incrementally outputting consecutive scan rows to the printing device to support rendering of source samples for each scan line. Scan lines are rendered into a raster buffer producing raster data from the samples in the scan rows. Thereafter the scan lines are printed.

Features of the invention can include one or more of the following advantages. The data in a rotated sampled image can be re-ordered to make the order of samples in an image store more closely approximate the order of samples intersected by raster device scan lines. This improves "locality of access" to the data. As a result, it becomes possible to efficiently cut the image data into bands, manage the image store incrementally, transport image data incrementally, and render the rotated image more efficiently.

The invention provides a process for efficiently re-ordering rotated image data to be arranged into sequences of scan rows. The samples in each scan row approximate the set of samples needed to render a particular raster device scan line, or a subset thereof. Sets of sequential reordered scan rows contain all the samples needed to render a particular band. The image data needed to render a given band may therefore be selected by selecting the corresponding set of sequential reordered scan rows.

The re-ordering does not change the number of samples in the image, nor the values of any of those samples. Thus, there is no degradation of the image compared to other image data management techniques, and no expansion of the data.

Some overlap is necessary when selecting a band; i.e., at the boundary between successive bands, some rotated image scan rows contain samples intersecting both bands. However, the maximum size of that overlap is a small constant number of rotated image scan rows, depending on the variant of the re-ordering process used. Thus, the selecting of bands is reliable, and the data expansion when transporting the data in bands is small and known in advance.

The re-ordered image data may be accessed by a rendering process in a way fundamentally similar to accessing non-re-ordered data. Thus, this invention is easily integrated with existing techniques for rendering rotated images as well as with other image data management techniques, including compression and re-sampling.

Sampled images received in slices may be re-ordered slice-by-slice into multiple data stores, or multiple slices may be re-ordered into a combined data store. The former may be more convenient; the latter decreases the number of subsets of image data to be managed and subsequently rendered.

Other features and advantages of the invention will become apparent from the following description, including the drawings and claims.

BRIEF DESCRIPTION OF THE DRAWINGS

FIG. 1 is a method for data management of a rotated image.

FIG. 2 is a representation of a source sampled image.

FIG. 3a shows a process flow for a transformation from source space to device space implemented by a print process.

FIG. 3b shows a sampled image in source space prior to transformation.

FIG. 3c shows a rotated sampled image after transformation to device space.

FIG. 4 is a method for reorganizing samples.

FIG. 5 is a representation of a sample image after reorganization into scan rows FIG. 6a is a schematic diagram of slope configurations for an ideal scan line (marking line).

FIG. 6b shows the adjustment of slope configurations when an x-y transposition process is applied.

FIG. 6c shows the adjustment of slope configurations when an x-axis reversal process is applied.

FIG. 6d shows the adjustment of slope configurations when an y-axis reversal process is applied.

FIG. 6e flow diagram for adjusting the slope for an ideal scan line into a eighth octant.

FIG. 7 shows the intersection of an ideal scan line and a source row.

FIG. 8a shows a sampled image including columns.

FIG. 8b is a flow diagram for a process of columns shifting a sampled image.

FIG. 9 shows a rotated sampled image.

FIG. 10a shows a sampled image including blocks.

FIG. 10b shows a block shifted sampled image.

DETAILED DESCRIPTION

FIG. 1 shows a method for data management 100 of a rotated image and includes receiving a source sampled image (102). The sampled image includes sequentially ordered samples defined in a source space. FIG. 2 shows a representation of a sampled image 200 including a plurality of sequential samples 202 arranged in source rows 204 in a source space defined by an origin 206, and x and y axes 208 and 209, respectively. A "sample" in source space is described and shown as a rectangle bounded by lattice points, rather than a lattice point itself. This configuration has been adopted to provide clarity for the description of one or more implementations. The sampled image can include source blocks 203. Source blocks are described in greater detail below in association with FIGS. 10a and 10b.

A transformation from source space to device space is defined (104). In one implementation, the transformation is implemented in the rendering of the source image by a raster device, for example a printer. In the example shown in FIG. 3a, a printer process 300 receives a source image 302 which is to be rendered using a transformation producing a rotated image 304 on a printout 306. In order to produce the rotated image 304, the source image is transformed and stored in a data store (not shown). Alternatively, portions of the source image may be temporarily stored prior to output in scan rows as described in greater detail below. Enlargements of the source image 302 received and a resultant rotated source image 308 (in device space) are shown in FIGS. 3b and 3c, respectively. Source image 302 is straight up and rectangular in shape in source space. The application of the rendering process produces rotated image 308 which is rotated with respect to printer space (device space).

Alternatively, the sampled source image may not be straight up, and the transformation from source space to device space may be used to transform a "rotated" source image to produce an image that appears straight up in device space. For example, the source image may be an image scanned into a device using a scanner or other optical recognition tool. During the scanning process, the original document may become rotated or skewed producing poor results. Accordingly, a transformation from source space to device space can be used to produce a straight up image in device space.

Returning to FIG. 1, an angle defining the transformation between source and device space is determined (106). The angle is an angle between the direction of the x-axis in source space (the "source direction") and the x-axis in device space (the "device direction"). The angle is conveniently calculated in source space, and all further references hereto are to angles in source space. In the printer example, an angle is determined between the fast scan direction in source space and the fast scan direction of scan lines in device space.

Using the angle, samples in the source image are reorganized into scan rows (108) and output (110). The step of reorganizing the samples in scan rows includes numerous steps and is described in detail below with reference to FIG. 4. The data management process 100 can output the scan rows to a raster buffer, frame buffer or other image or data store for use by a raster device (e.g., printer). Thereafter, the data management process ends (112).

Referring now to FIG. 4, the process of reorganizing samples in scan rows (step 108 of FIG. 1) includes drawing one or more marking lines across source space (402). The lines are parallel (within a desired accuracy) to the device direction. Where the device is a printer, the marking lines are parallel to scan lines in device space, and are called "ideal scan lines". The spacing and positioning of the ideal scan lines is such that all image samples are intersected by at least one ideal scan line. The samples intersected by a line are associated with that ideal scan line (404). A disambiguation rule is defined so that samples intersected by more than one ideal scan line are associated with exactly one ideal scan line. In one implementation, the process may adjust the exact spacing and positioning of the ideal scan lines to maximize the number of samples associated with each ideal scan line, without causing the disambiguation rule to break down, and without leaving any un-associated samples. The maximization step need not be applied to a theoretical maximum, but may be stopped at any desired stage. The closer to true maximum that is achieved, the smaller the number of scan rows to manage, and the smaller the number of overlapping scan rows between bands. Note that the amount of overlap between bands is a simple mathematical result derived from the number of scan rows required to render a single scan line (up to three) and the sequentiality of scan lines.

The samples are then read out in sequence, in the order in which they are intersected by their associated ideal scan line (406). The sequences of samples constitute the "scan rows". FIG. 5 shows a sampled image 500 after reorganization of the samples. The sampled image 500 includes a plurality of scan rows 502 each including samples from one or more original source rows associated with the sampled image 302 (FIG. 3b). While the original image included 6 source rows of data, the samples occupy more than 6 scan rows in the data store after the application of the transformation from source space to device space. However, the data may be incrementally managed and discarded after transfer to the rendering engine whereas such could not be accomplished with prior systems.

In one implementation, the ideal scan lines are exactly parallel to the scan lines in device space (within computational accuracy), and are positioned and spaced so that they pass through the integer lattice points of the 'y' axis in source space. If the slope of the ideal scan lines is between 0 and −1 in source space (i.e., between 0 and −45 degrees, assuming equal scaling of the 'x' and 'y' axes in source space), the disambiguation rule may be applied to select samples based on the intersection of an ideal scan line with a given sample. If an ideal scan line intersects the left edge of a sample, then the sample is associated with the particular ideal scan line. There will never be more than one such line, and when a second line intersects the sample it is guaranteed to intersect the top edge but not the left edge.

If the slope of the ideal scan lines is outside the range 0 to −1, then source space is first transformed by a transposition of the axes and/or by inversion on one or both axes, to force the slope of the ideal scan lines into this range. Those of ordinary skill in the art will recognize that transposition is comparable to rotation of 90 degrees in combination of an appropriate inversion. Referring now to FIG. 6a, a diagram showing the possible slope configurations for the ideal scan lines is shown. Eight octants numbered 1 through 8 are presented. If the slope of the ideal scan lines is between 0 and −1, then the slope falls in octant 8 and no additional transformation is required. For slopes falling in the other seven octants, a sequence of one or more transformations is applied to force the slope into the eighth octant prior to performing the reorganization of samples described above with reference to step 108 in FIG. 1. For the purposes of this discussion, reference is made to the slope of the idealized scan lines. The slope of the idealized scan lines is equal to the angle determined in step 106 (FIG. 1) defined as the angle between the source and device directions, respectively. Thus in one configuration, the slope and angle are equivalent expressions that reflect the rotation of the source image in source space relative to device space.

Referring now to FIG. 6e, a method for adjusting the slope (angle) includes determining if the slope is between 0 and −45 degrees (610). If so, the process ends (630). Else, a check is made to determine if the slope is between 45 and 135 degrees or −135 and −45 degrees (612). If so, then the order of samples is initially revised by inverting the samples relative to a line at 45 degrees passing through an origin of the source image (614). The inversion of the samples about the 45 degree line results in the transposition of the X and Y axis. The inversion results in the adjustment of the slope for elements in the various octants as is shown in FIG. 6b. Note that the order of samples can be changed at this step or a change can be effectuated by merely changing the order in which samples are read out. Finally, the transposition of samples results in a new effective slope for the marking line which may or may not require further transformations as described below.

If the original slope or the effective new slope due to transposition is between 135 and 225 degrees (step 616), the x-coordinate ordering of the samples is reversed (618). The reverse ordering results in the adjustment of the slope for elements in the various octants as is showed in FIG. 6c. The reverse ordering of samples results in a new effective slope which may or may not require further transformations as described below.

Finally, if the original slope or the effective new slope (after transposition or the combination of transposition followed by reverse ordering) is between 0 and 45 degrees (620), then the y-coordinate ordering of the samples is reversed (622). The reverse ordering results in the adjustment of the slope for elements in the various octants as is showed in FIG. 6d. Thereafter the process ends (630).

Taking a few examples, a slope (angle) falling in the seventh octant is first inverted (step 614) producing an effective slope in the fourth octant. Since the slope falls in the fourth octant, the x order is reversed (step 618), resulting in an effective slope falling in the first octant. Finally, the y ordering is reversed (step 622), resulting in an effective slope falling in the eight octant, therein ending the process.

There are multiple mathematical ways to determine slope of the ideal scan line in source space including using numerical techniques and or matrix mathematics. One implementation requires the measurement of two quantities referred to as span_x and span_y. Referring now to FIG. 7, span_x is the distance from point a to point b along an ideal scan line 700, and more particularly, the length of the hypotenuse of a right triangle formed by the intersection of the ideal scan line 700 and a first sample 702 of the source image 704. Span_y is the distance from point a to point c along the ideal scan line, and more particularly, the length of the hypotenuse of a right triangle formed by the intersection of the ideal scan line 700 and a last sample 706 in the current source row 708 that ideal scan line 700 passes through prior to leaving the current scan row 708. The slope of the ideal scan line can be determined based on the relative magnitudes of span_x and span_y, as well as the sign of each quantity. For example, if span_y>span_x then the slope falls in octants 1, 4, 5 or 8. If span_x>span y then the x and y axes need to be transposed. Finally, the sign of the spans provides further definition for the octant in which the slope can be characterized.

In another implementation, the process of determining the angle includes determining if the angle measured in source space is in a desired octant, and if not initially adjusting the organization of the samples so that the angle is in the desired octant. The step of initially adjusting includes determining if the angle or an effective new angle is in a set of four preferred octants, and, if not, revising the ordering of samples by transposing the samples relative to a line at 45 degrees passing through an origin of the source image resulting in an effective new angle falling within the set of preferred octants. In one implementation, the preferred octants are octants 1, 4, 5 and 8.

The step of initially adjusting can include determining if the angle or the effective new angle is in a set of four preferred octants, and, if not, revising the ordering of samples by reversing the x coordinate ordering of the samples resulting in an effective new angle falling within the set of preferred octants. In this case the preferred octants are octants 1, 2, 7 and 8.

Finally, the step of initially adjusting can include determining if the angle or the effective new angle is in a set of four preferred octants, and, if not, revising the ordering of samples by reversing the y coordinate ordering of the samples resulting in an effective new angle falling within the set of preferred octants. Here the preferred octants are octants 5, 6, 7 and 8.

The described method can include the application of one or more of the initial adjustments described above. In addition, the step of adjusting the organization of the source samples can be combined with other image processing steps, such as compression, decompression, resampling, color correction, etc., to achieve computational efficiency compared to doing such steps in sequence.

In one implementation, the reorganization of samples can be accomplished in a very computationally simple way. Referring to FIG. 8a, sampled image 302 can be viewed as comprising one or more source rows 310 and one or more source columns 312. If the slope of the ideal scan lines is between 0 and −1 in source space, columns of samples can be shifted vertically to re-order the samples without requiring computations for each individual sample. The vertical shifts are incremental accumulating across the width of the source image. The output step results in a reading of scan rows "across" a column-shifted image, in the source direction. Optimum locality of access is preserved, because columns (or rows depending on the slope and any inversion process) are never shifted more than the span of a single sample.

An ideal scan line having a slope of −1/3.5 is shown.

The process for determining where the column shift boundaries fall is shown in FIG. 8b. The process 800 begins at step 802 by drawing a single marking line (812 in FIG. 8a) that spans the width of the source image. The single marking line is used to determine transitions based on the slope of the marking line. The transitions mark a point in a source row where adjacent samples would be assigned to different marking lines (hypothetical marking lines, since only one actual marking line is drawn) if multiple marking lines were drawn. The single marking line can be used to locate the transitions as the line spans the width of the source image. More particularly, a transition point is located at each sample where the marking line exits the sample and enters a next source row (804). Transitions 814 associated with the sampled image are shown in FIG. 8a. The last sample touched in a current source row marks the transition point. A column shift of samples at each transition point produces the desired scan row configuration (806). The column shift is performed for every sample bounded by pairs of transition points. That is, all of the samples in one or more columns are shifted one sample vertically. Thereafter the process ends (808).

FIG. 9 shows a column-shifted image 900 of the sampled image 302 after column shifting. The column-shifted image 900 includes a plurality of scan rows 902 that may be easily output to a raster device for processing. Those of ordinary skill will recognize that the column shifts occur in a pattern based on the slope of the idealized scan lines (marking lines), where the number of columns shifted is always n or n−1, where n is equal to the number of samples included in a first block of samples in the first source row bounded by the edge of the sampled image and the first transition point.

In certain source images, the single marking line spans the width of the source image while remaining within the boundaries of the source image. For other configurations, the single marking line can be extended outside of the boundary of the source image along a length until the single marking line spans the entire width of the source image. In this way, transitions can be identified using extended source columns that extend beyond the bounds of the original source image. Again, since column shifting is used, the location of the transition points can be made based on the slope of the marking line whether or not the line actually remains within the source image boundaries.

The description above has been made to source sampled images without reference to sample data values. Each source sample includes one or more data bits representative of a shade or color for the source image at a particular point. A sample has a depth, that is a number of bits required to represent the sample data value. A one bit deep data value for each sample may be used to represent black or white. Alternatively, the data values may have a depth that is greater than one, and indicate an intensity value in terms of a gray scale shade or color shade for a color component in a color gamut and can include an alpha value for indicating a transparency effect. When reorganizing and reordering samples, computationally difficult operations are required when the sample data to be shifted does not fall on an even byte boundary.

For example, if each sample is represented by 8 bits of intensity data, shifting of individual samples falls on byte boundaries. Where, however, the source samples have a depth that does not align on byte boundaries, then the processes of transposition, reverse ordering and column shifting as described above become computationally intensive.

To minimize the computational gymnastics, in one implementation, reorganization, transposition and reverse ordering is performed on blocks of samples. A block includes the minimum number of samples required to achieve byte alignment. Each block has two properties, a horizontal block width and vertical block height. If each sample is one bit deep, then a horizontal block width can be defined to include 8 samples (assuming the byte size is 8 bits). Similarly, if each sample were represented by one bit in each of four color components, then the horizontal block width can be two samples (1 bit x 4 color components=4 bits per sample, and two samples to align with a byte boundary). Similarly, if each sample included 2 bit deep color data for 4 color components, the horizontal block width can be set to one sample. The examples recited above reflect a "chunky data" environment where all data values associated with a sample (in each color plane) are grouped together. Alternatively, the data may be planar data, where sample values for each color plane of data are grouped together. In either example, byte alignment issues may arise.

The vertical block height is determined based on the slope of an ideal scan line and is calculated by determining the number of source rows that are passed through by an ideal scan line before reaching the end of a column (as defined by the horizontal block width). So, in the example shown in FIG. 10b (associated with the sampled image shown in FIG. 10a), the slope of the ideal scan line is −7/10, the horizontal block width is 4 samples (if the depth of each sample is 2 bits) and the vertical block height is 2 samples (based on the number of rows passed through (rows A and A−1) by the ideal scan line before reaching the horizontal block boundary at sample 4.

When performing any manipulations, transposition, shifts or the like, blocks of samples are manipulated instead of individual samples. In addition, rather than shifting each sample in a column by one unit (as described above), the shift is an integer number of units equal to the vertical block height.

The data management process described can be used to create an optimized data store for holding over data prior to rendering. During rendering, portions of the data store can be discarded incrementally, as chunks of the data are no longer required to support the rendering of particular scan lines into a raster buffer.

Conventional rendering processes for a rotated image typically involves one of two methods. In a first method, each source sample is examined and all the device raster elements covered by that sample are painted the color of the sample. In a second method, the source sample that overlays each raster element is calculated and thereby the color of the raster element is determined. Either of these methods can be invoked when rendering samples from scan rows produced by the process described herein. The methods can be readily modified to utilize data reorganized as described in this invention.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

The processes described herein can be executed by a computer system. One such computer system includes a CPU, RAM, and an I/O controller coupled by a CPU bus. The I/O controller is also coupled by an I/O bus to input devices such as a keyboard and a mouse, and output devices such as a monitor.

A typical printer can be driven by the computer system. A printer embodying the invention includes an input/output (I/O) interface for receiving raster input over a cable or network from the host computer which outputs the raster data to the common bus. Error messages and control information relating to the transfer of data is communicated back to the host via the I/O interface. As the raster data is received, it is stored in random access memory (RAM) over the common bus. A microprocessor on the common bus provides the control for supplying the raster data to the print engine controller, which in turn passes the raster data to the electro-mechanical print engine that applies the image to paper.

The programs for the microprocessor can be permanently stored in a read-only memory (ROM). Input data and all other variable data can be stored in shared RAM.

A standard commercial microprocessor, such as the Motorola 68000 family or the Intel i960 family can be used as the microprocessor. The RAM is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method of managing a source image that is output in a rotated or skewed orientation to a raster buffer, the source image including a plurality of source samples defined in a source space and arranged in source rows having a source direction, the raster buffer oriented in a destination space and receiving the rotated or skewed image as a series of samples in rows defined by a destination direction, the raster buffer providing rows of samples to a rendering device for rendering scan lines for output on a raster device, the method comprising:

determining an angle between the source direction and the destination direction;

adjusting an organization of the source samples in the source space to align source samples in scan rows; and outputting the scan rows to the raster buffer where each scan line can be rendered from the raster buffer using at most a predetermined small number of scan rows.

2. The method of claim 1, wherein the step of determining the angle includes determining if the angle measured in source space is between 0 and −45 degrees, and if not initially adjusting the organization of the samples so that the angle is between 0 and −45 degrees.

3. The method of claim 2 where the step of initially adjusting includes determining if the angle or an effective new angle is between 45 and 135 degrees or −135 and −45 degrees, and, if so, revising the ordering of samples by transposing the samples relative to a line at 45 degrees passing through an origin of the source image resulting in an effective new angle falling between −45 and 45 degrees or 135 and 225 degrees.

4. The method of claim 2 where the step of initially adjusting includes determining if the angle or an effective new angle is between 90 and 270 degrees, and, if so, reversing the x coordinate ordering of the samples resulting in an effective new angle falling between 90 and −90 degrees.

5. The method of claim 2 where the step of initially adjusting includes determining if the angle or an effective new angle is between 0 and 180 degrees, and, if so, reversing the y coordinate ordering of the samples resulting in an effective new angle falling between 0 and −180 degrees.

6. The method of claim 2, wherein the step of initially adjusting includes processes selected from the group of transposing in both axes, reversing the ordering in the x-axis and reversing the ordering in the y-axis for samples depending on the slope.

7. The method of claim 1, further comprising locating one or more marking lines that span a width of the source image, the marking lines parallel to the rows in the raster buffer and having a slope defined by the angle;

identifying transition points along the length of a marking line, each transition point defining a last source sample in a current source row that the marking line passes through prior to transitioning to a next source row of source samples; and where the step of adjusting includes shifting columns of source samples enclosed between transition points to align the source samples in scan rows.

8. The method of claim 7 where the marking line is a idealized scan line.

9. The method of claim 7 where only one marking line is located spanning the width of the source image and enclosed within the boundaries of the source image.

10. The method of claim 7 where only one marking line is located that extends beyond the boundaries of the source image and spans the entire width of the source image.

11. The method of claim 1 wherein the step of adjusting the organization of the source samples is combined with other image processing steps selected from the group of compression, decompression, resampling and color correction to achieve computational efficiency compared to doing such steps in a sequence.

12. The method of claim 1, further comprising locating one or more marking lines spanning a width of the source image;

identifying transition points along a width of the source image, the transition points defining a point where adjacent source samples in a source row map to different marking lines; and wherein the step of adjusting includes shifting columns of source samples enclosed between transition points to align the source samples in scan rows.

13. The method of claim 12, wherein each sample is mapped to exactly one marking line.

14. The method of claim 13, wherein the columns are incrementally shifted one unit at each transition point, the incremental shifts accumulating across a width of the sampled image.

15. The method of claim 14, where one unit is equal to one row.

16. The method of claim 14 where one unit is one block and where a block is sized to achieve byte alignment when adjusting samples.

17. The method of claim 1, wherein the predetermined small number of scan rows is three.

18. The method of claim 1, further comprising locating a plurality of marking lines spanning a width of the source image; and wherein the step of adjusting includes associating each source sample with a single marking line and adjusting the order of the samples including assigning all source samples associated with each marking line to a unique scan row.

19. The method of claim 18 further comprising associating a source sample with a marking line that intersects the source sample.

20. The method of claim 19 where the step of associating includes determining if a source sample is intersected by two or more marking lines associated with two or more scan rows and if so, assigning the source sample to a first scan row that is to be rendered of the two or more scan rows.

21. The method of claim 1, wherein all source rows of the source image are available for processing and wherein the step of outputting outputs data to the rendering device a scan row at a time.

22. The method of claim 21, wherein the step of outputting identifies all source samples associated with a scan row and outputs all those source samples in order as a scan row to the rendering device.

23. The method of claim 1, wherein the scan rows are stored in a memory device and wherein the source rows are received and processed a slice at a time.

24. The method of claim 23, wherein a slice includes a set of source rows.

25. The method of claim 24 where each source row is processed including determining which scan row to assign each source sample and storing the source sample in the assigned scan row in the memory device.

26. The method of claim 1 wherein the source samples are not byte aligned, the method further including grouping source samples in blocks that are aligned with a byte boundary and wherein the step of adjusting the ordering of samples adjusts groups of samples on block boundaries.

27. The method of claim 26, wherein the step of adjusting includes determining a horizontal block width defining a number of consecutive samples grouped together in a block of samples to achieve byte boundary alignment;

determining a vertical block height defining a number of consecutive horizontal samples in consecutive rows to be grouped together in each block of samples, the vertical block height determined using the angle and the horizontal block width.

28. A method of managing data for a source image to be printed in a rotated or skewed orientation on an printing device, the source image including a plurality of source samples defined in a source space and arranged in source rows having a source direction, the printing device printing a rotated source image in a series of scan lines defined by a scan direction, the method comprising:

determining an angle between the source direction and the scan direction;

locating an idealized scan line that spans a width of the source image, the idealized scan line parallel to the scan lines of the printing device and having a slope defined by the angle;

identifying transition points along the length of the idealized scan line, each transition point defining a last sample in a source row touched by the idealized scan line;

adjusting an organization of the source samples in the source space including shifting columns of source samples enclosed between transition points to align the source samples in scan rows; and incrementally outputting consecutive scan rows to the printing device to support rendering of source samples for each scan line.

29. A method of managing a source image that is transferred in a rotated or skewed orientation to an output buffer, the source image including a plurality of source samples defined in a source space and arranged in source rows having a source direction, the output buffer oriented in a destination space and receiving the rotated or skewed image as a series of samples in destination rows defined by a destination direction, the output buffer outputting the rotated or skewed image in an output order to another device, the method comprising:

determining an angle between the source direction and the destination direction; and adjusting an organization of the source samples in the source space to align source samples in scan rows to reflect the output ordering of the output buffer.

30. A method of incrementally managing image data that is output in a rotated or skewed orientation to a raster buffer, the image data including a plurality of source samples defined in a source space and arranged in source rows having a source direction, the raster buffer oriented in a destination space and receiving the rotated or skewed image data as a series of samples in destination rows defined by a destination direction, the method comprising:

determining an angle between the source direction and the destination direction;

adjusting an organization of the source samples in the source space to align source samples in scan rows to reflect a render ordering of destination rows of the raster buffer;

storing the reorganized samples in a intermediary data store; and incrementally transferring a set of scan rows at a time to a rendering device for rendering and deleting a transferred set from the intermediary data store.

31. A method for minimizing the number of samples provided to a rendering engine in order to render a rotated or skewed image comprising:

receiving a sampled image defined in a source space, the sampled image including a plurality of source samples arranged in source rows having a source direction;

identifying a destination region intersecting a portion of the sampled image, the destination region oriented in a destination space reflecting a render ordering of a rotated or skewed transformation of the sampled image to the destination space;

selecting a subset of the samples of the sampled image that are enclosed by the destination region;

arranging the selected subset of samples into scan rows in the source space; and providing the rows of samples associated with the destination region to the render engine in scan row order.

32. A method of managing data for a source image to be printed in a rotated or skewed orientation on an printing device, the source image including a plurality of source samples defined in a source space and arranged in source rows having a source direction, the printing device printing a rotated source image in a series of scan lines defined by a scan direction, the method comprising:

adjusting an organization of the source samples in the source space including shifting columns of source samples to align the source samples in scan rows;

incrementally outputting consecutive scan rows to the printing device to support rendering of source samples for each scan line;

rendering scan lines into a raster buffer producing raster data from the samples in the scan rows; and printing the scan lines.

33. A computer program product, tangibly stored on a computer-readable medium, for managing a source image that is output in a rotated or skewed orientation to a raster buffer, the source image including a plurality of source samples defined in a source space and arranged in source rows having a source direction, the raster buffer oriented in a destination space and receiving the rotated or skewed image as a series of samples in rows defined by a destination direction, the raster buffer providing rows of samples to a rendering device for rendering scan lines for output on a raster device, the product comprising instructions operable to cause a programmable processor to:

determine an angle between the source direction and the destination direction;

adjust an organization of the source samples in the source space to align source samples in scan rows; and output the scan rows to the raster buffer where each scan line can be rendered from the raster buffer using at most a predetermined small number of scan rows.

34. The product of claim 33, wherein the instructions to determine the angle include instructions operable to cause a programmable processor to determine if the angle measured in source space is between 0 and −45 degrees, and if not initially adjust the organization of the samples so that the angle is between 0 and −45 degrees.

35. The product of claim 34, wherein the instructions to initially adjust include instructions operable to cause a programmable processor to determine if the angle or an effective new angle is between 45 and 135 degrees or −135 and −45 degrees, and, if so, revise the ordering of samples by transposing the samples relative to a line at 45 degrees passing through an origin of the source image resulting in an effective new angle falling between −45 and 45 degrees or 135 and 225 degrees.

36. The product of claim 34, wherein the instructions to initially adjust include instructions operable to cause a programmable processor to determine if the angle or an effective new angle is between 90 and 270 degrees, and, if so, reverse the x coordinate ordering of the samples resulting in an effective new angle falling between 90 and −90 degrees.

37. The product of claim 34, wherein the instructions to initially adjust include instructions operable to cause a programmable processor to determine if the angle or an effective new angle is between 0 and 180 degrees, and, if so, reverse the y coordinate ordering of the samples resulting in an effective new angle falling between 0 and −180 degrees.

38. The product of claim 34, wherein the instructions to initially adjust include instructions operable to cause a programmable processor to perform processes selected from the group of transposing in both axes, reversing the ordering in the x-axis and reversing the ordering in the y-axis for samples depending on the slope.

39. The product of claim 33, further comprising instructions operable to cause a programmable processor to:

locate one or more marking lines that span a width of the source image, the marking lines parallel to the rows in the raster buffer and having a slope defined by the angle;

identify transition points along the length of a marking line, each transition point defining a last source sample in a current source row that the marking line passes through prior to transitioning to a next source row of source samples; and where the instructions to adjust include instructions operable to cause a programmable processor to shift columns of source samples enclosed between transition points to align the source samples in scan rows.

40. The product of claim 39, where the marking line is a idealized scan line.

41. The product of claim 39, where only one marking line is located spanning the width of the source image and enclosed within the boundaries of the source image.

42. The product of claim 39, where only one marking line is located that extends beyond the boundaries of the source image and spans the entire width of the source image.

43. The product of claim 33, further comprising instructions operable to cause a programmable processor to combine adjusting the organization of the source samples with other image processing steps selected from the group of compression, decompression, resampling and color correction to achieve computational efficiency compared to doing such steps in a sequence.

44. The product of claim 33, further comprising instructions operable to cause a programmable processor to:

locate one or more marking lines spanning a width of the source image;

identify transition points along a width of the source image, the transition points defining a point where adjacent source samples in a source row map to different marking lines; and wherein the instructions to adjust include instructions operable to cause a programmable processor to shift columns of source samples enclosed between transition points to align the source samples in scan rows.

45. The product of claim 44, wherein each sample is mapped to exactly one marking line.

46. The product of claim 45, wherein the columns are incrementally shifted one unit at each transition point, the incremental shifts accumulating across a width of the sampled image.

47. The product of claim 46, where one unit is equal to one row.

48. The product of claim 46, where one unit is one block and where a block is sized to achieve byte alignment when adjusting samples.

49. The product of claim 33, wherein the predetermined small number of scan rows is three.

50. The product of claim 33, further comprising instructions operable to cause a programmable processor to:
locate a plurality of marking lines spanning a width of the source image; and
wherein the instructions to adjust include instructions operable to cause a programmable processor to associate each source sample with a single marking line and adjust the order of the samples including assigning all source samples associated with each marking line to a unique scan row.

51. The product of claim 50, further comprising instructions operable to cause a programmable processor to:
associate a source sample with a marking line that intersects the source sample.

52. The product of claim 51, where the instructions to associate include instructions operable to cause a programmable processor to determine if a source sample is intersected by two or more marking lines associated with two or more scan rows and if so, assign the source sample to a first scan row that is to be rendered of the two or more scan rows.

53. The product of claim 33, wherein all source rows of the source image are available for processing and wherein the instructions to output are operable to cause a programmable processor to output data to the rendering device a scan row at a time.

54. The product of claim 53, wherein the instructions to output are operable to cause a programmable processor to identify all source samples associated with a scan row and output all those source samples in order as a scan row to the rendering device.

55. The product of claim 33, wherein the scan rows are stored in a memory device and wherein the source rows are received and processed a slice at a time.

56. The product of claim 55, wherein a slice includes a set of source rows.

57. The product of claim 56, where each source row is processed, the product further comprising instructions operable to cause a programmable processor to determine which scan row to assign each source sample and store the source sample in the assigned scan row in the memory device.

58. The product of claim 33, wherein the source samples are not byte aligned, the product further comprising instructions operable to cause a programmable processor to group source samples in blocks that are aligned with a byte boundary and wherein the instructions to adjust the ordering of samples are operable to cause a programmable processor to adjust groups of samples on block boundaries.

59. The product of claim 58, wherein the instructions to adjust include instructions operable to cause a programmable processor to:
determine a horizontal block width defining a number of consecutive samples grouped together in a block of samples to achieve byte boundary alignment; and
determine a vertical block height defining a number of consecutive horizontal samples in consecutive rows to be grouped together in each block of samples, the vertical block height determined using the angle and the horizontal block width.

60. A computer program product, tangibly stored on a computer-readable medium, for managing data for a source image to be printed in a rotated or skewed orientation on an printing device, the source image including a plurality of source samples defined in a source space and arranged in source rows having a source direction, the printing device printing a rotated source image in a series of scan lines defined by a scan direction, the product comprising instructions operable to cause a programmable processor to:
determine an angle between the source direction and the scan direction;
locate an idealized scan line that spans a width of the source image, the idealized scan line parallel to the scan lines of the printing device and having a slope defined by the angle;
identify transition points along the length of the idealized scan line, each transition point defining a last sample in a source row touched by the idealized scan line;
adjust an organization of the source samples in the source space including shifting columns of source samples enclosed between transition points to align the source samples in scan rows; and
incrementally output consecutive scan rows to the printing device to support rendering of source samples for each scan line.

61. A computer program product, tangibly stored on a computer-readable medium, for managing a source image that is transferred in a rotated or skewed orientation to an output buffer, the source image including a plurality or source samples defined in a source space and arranged in source rows having a source direction, the output buffer oriented in a destination space and receiving the rotated or skewed image as a series of samples in destination rows defined by a destination direction, the output buffer outputting the rotated or skewed image in an output order to another device, the product comprising instructions operable to cause a programmable processor to:
determine an angle between the source direction and the destination direction; and
adjust an organization of the source samples in the source space to align source samples in scan rows to reflect the output ordering of the output buffer.

62. A computer program product, tangibly stored on a computer-readable medium, for incrementally managing image data that is output in a rotated or skewed orientation to a raster buffer, the image data including a plurality of source samples defined in a source space and arranged in source rows having a source direction, the raster buffer oriented in a destination space and receiving the rotated or skewed image data as a series of samples in destination rows defined by a destination direction, the product comprising instructions operable to cause a programmable processor to:
determine an angle between the source direction and the destination direction;
adjust an organization of the source samples in the source space to align source samples in scan rows to reflect a render ordering of destination rows of the raster buffer;
store the reorganized samples in a intermediary data store; and
incrementally transfer a set of scan rows at a time to a rendering device for rendering and deleting a transferred set from the intermediary data store.

63. A computer program product, tangibly stored on a computer-readable medium, for minimizing the number of samples provided to a rendering engine in order to render a rotated or skewed image, the product comprising instructions operable to cause a programmable processor to:

receive a sampled image defined in a source space, the sampled image including a plurality of source samples arranged in source rows having a source direction;

identify a destination region intersecting a portion of the sampled image, the destination region oriented in a destination space reflecting a render ordering of a rotated or skewed transformation of the sampled image to the destination space;

select a subset of the samples of the sampled image that are enclosed by the destination region;

arrange the selected subset of samples into scan rows in the source space; and provide the rows of samples associated with the destination region to the render engine in scan row order.

64. A computer program product, tangibly stored on a computer-readable medium, for managing data for a source image to be printed in a rotated or skewed orientation on an printing device, the source image including a plurality of source samples defined in a source space and arranged in source rows having a source direction, the printing device printing a rotated source image in a series of scan lines defined by a scan direction, the product comprising instructions operable to cause a programmable processor to:

adjust an organization of the source samples in the source space including shifting columns of source samples to align the source samples in scan rows;

incrementally output consecutive scan rows to the printing device to support rendering of source samples for each scan line;

render scan lines into a raster buffer producing raster data from the samples in the scan rows; and print the scan lines.

* * * * *

UNITED STATES PATENT AND TRADEMARK OFFICE
CERTIFICATE OF CORRECTION

PATENT NO. : 6,611,631 B1
DATED : August 26, 2003
INVENTOR(S) : Blair et al.

It is certified that error appears in the above-identified patent and that said Letters Patent is hereby corrected as shown below:

Title page,
Item [56], References Cited, OTHER PUBLICATIONS, please delete the duplicate entry "Floey et al., "Computer Graphics Principles and Practice", Sec. Edition, Addison-Wesley Publishing Co., pp. 828-835, 1990."

Column 14,
Line 63, after "is" replace "a" with -- an --;

Column 15,
Line 64, after "including" insert -- : --;

Column 16,
Line 16, after "on" replace "an" with -- a --;

Column 17,
Line 1, after "in" replace "a" with -- an --;
Line 25, after "on" replace "an" with -- a --;

Column 18,
Line 43, after "is" replace "a" with -- an --;

Column 20,
Line 8, after "on" replace "an" with -- a --;
Line 63, after "in" replace "a" with -- an --;

Column 22,
Line 3, after "on" replace "an" with -- a --.

Signed and Sealed this

Fifteenth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,611,631 B1
DATED : August 26, 2003
INVENTOR(S) : Blair et al.

It is certified that error appears in the above-identified patent and that said Letters Patent is hereby corrected as shown below:

<u>Title page,</u>
Item [56], References Cited, OTHER PUBLICATIONS, please delete the duplicate entry "Foley et al., "Computer Graphics Principles and Practice", Sec. Edition, Addison-Wesley Publishing Co., pp. 828-835, 1990."

<u>Column 14,</u>
Line 63, after "is" replace "a" with -- an --;

<u>Column 15,</u>
Line 64, after "including" insert -- : --;

<u>Column 16,</u>
Line 16, after "on" replace "an" with -- a --;

<u>Column 17,</u>
Line 1, after "in" replace "a" with -- an --;
Line 25, after "on" replace "an" with -- a --;

<u>Column 18,</u>
Line 43, after "is" replace "a" with -- an --;

<u>Column 20,</u>
Line 8, after "on" replace "an" with -- a --;
Line 63, after "in" replace "a" with -- an --;

UNITED STATES PATENT AND TRADEMARK OFFICE
CERTIFICATE OF CORRECTION

PATENT NO. : 6,611,631 B1
DATED : August 26, 2003
INVENTOR(S) : Blair et al.

It is certified that error appears in the above-identified patent and that said Letters Patent is hereby corrected as shown below:

Column 22,
Line 3, after "on" replace "an" with -- a --.

This certificate supersedes Certificate of Correction issued June 15, 2004.

Signed and Sealed this

Twenty-ninth Day of March, 2005

JON W. DUDAS
*Director of the United States Patent and Trademark Office*